US009565626B2

United States Patent
Faccin et al.

(10) Patent No.: US 9,565,626 B2
(45) Date of Patent: Feb. 7, 2017

(54) PRIORITIZING RADIO ACCESS TYPES FOR CLOSED SUBSCRIBER GROUP CELLS

(71) Applicant: QUALCOMM Incorporated, San Diego, CA (US)

(72) Inventors: Stefano Faccin, Hayward, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 77 days.

(21) Appl. No.: 14/157,430

(22) Filed: Jan. 16, 2014

(65) Prior Publication Data

US 2014/0198753 A1    Jul. 17, 2014

Related U.S. Application Data

(60) Provisional application No. 61/753,872, filed on Jan. 17, 2013.

(51) Int. Cl.
*H04W 48/20* (2009.01)
*H04W 48/08* (2009.01)
*H04W 48/16* (2009.01)
*H04W 48/18* (2009.01)

(52) U.S. Cl.
CPC ............. *H04W 48/20* (2013.01); *H04W 48/08* (2013.01); *H04W 48/16* (2013.01); *H04W 48/18* (2013.01)

(58) Field of Classification Search
CPC ...... H04W 48/20; H04W 48/08; H04W 48/18; H04W 48/16
See application file for complete search history.

(56) References Cited

U.S. PATENT DOCUMENTS

| | | | |
|---|---|---|---|
| 2009/0238117 A1* | 9/2009 | Somasundaram et al. | ... 370/328 |
| 2011/0110300 A1* | 5/2011 | Sachs et al. | ................... 370/328 |
| 2011/0170481 A1 | 7/2011 | Gomes et al. | |
| 2013/0012182 A1* | 1/2013 | Liao | .............................. 455/418 |

(Continued)

FOREIGN PATENT DOCUMENTS

| | | |
|---|---|---|
| EP | 2373095 A1 | 10/2011 |
| EP | 2544487 A1 | 1/2013 |
| WO | 2009127238 A1 | 10/2009 |

OTHER PUBLICATIONS

International Search Report and Written Opinion—PCT/US2014/012101—ISA/EPO—May 21, 2014 (131326W0).

(Continued)

*Primary Examiner* — Ian N Moore
*Assistant Examiner* — Lakeram Jangbahadur
(74) *Attorney, Agent, or Firm* — Harrity & Harrity, LLP (57) ABSTRACT

A network entity may be configured for prioritizing radio access types for CSG cells of a wireless communication system by storing priority information defining, for each of one or more types of data traffic (e.g., IP traffic, voice traffic, etc.), a priority ranking of cell types comprising at least one of different wireless technologies and different access control types (e.g., a CSG mode, a hybrid mode and an open mode), and indicating the priority information to a mobile device for connecting to cells of a wireless communications system. A corresponding mobile entity may be configured for receiving the priority information as described, and selecting a cell to connect to or camp on based on the priority information.

29 Claims, 6 Drawing Sheets (56) References Cited

U.S. PATENT DOCUMENTS

2013/0012260 A1* 1/2013 Salkintzis ............ H04W 48/08
455/550.1

OTHER PUBLICATIONS

"Universal Mobile Telecommunications System (UMTS), LTE, Access Network Discovery and Selection Function (ANDSF) Management Object (MO) (3GPP TS 24.312 version 10.6.0 Release 10)", Technical Specification, European Telecommunications Standards Institute (ETIS ), 650, Route Des Lucioles, F-06921 Sophia-Antipolis, France, vol. 3GPP CT 1, No. V10.6.0, Jul. 1, 2012 (Jul. 1, 2012), XP014070318, p. 11, paragraph 4.1.1-p. 12, paragraph 4.1.2 p. 21, paragraph 5.4.6-p. 22, paragraph 5.4.9 figure 4.2.2.

* cited by examiner

PRIORITIZING RADIO ACCESS TYPES FOR CLOSED SUBSCRIBER GROUP CELLS

CROSS-REFERENCE TO RELATED APPLICATION

This application claims priority under 35 U.S.C. §119(e) to U.S. provisional application Ser. No. 61/753,872, filed Jan. 17, 2013, which application is incorporated herein by reference, in its entirety.

FIELD

This application is directed generally to wireless communication systems. More particularly, but not exclusively, the application relates to systems and apparatus for prioritizing radio access types for closed subscriber group (CSG) cells.

BACKGROUND

Wireless communication systems are widely deployed to provide various types of communication content such as voice, data, video, and the like, and deployments are likely to increase with introduction of new data oriented systems such as Long Term Evolution (LTE) systems. Wireless communication systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and other orthogonal frequency division multiple access (OFDMA) systems.

Generally, a wireless multiple-access communication system can simultaneously support communication for multiple wireless terminals (also know as user equipments (UEs), user terminals, or access terminals (ATs)). Each terminal communicates with one or more base stations (also know as access points (APs), EnodeBs, or eNBs) via transmissions on forward and reverse links. The forward link (also referred to as a downlink or DL) refers to the communication link from the base stations to the terminals, and the reverse link (also referred to as an uplink or UL) refers to the communication link from the terminals to the base stations. These communication links may be established via single-in-single-out, single-in-multiple out, multiple-in-single-out, or multiple-in-multiple-out (MIMO) systems.

Cellular wireless communications systems may include different types of cells providing access to communications networks, and many modern wireless terminals are capable of connecting to or camping on more than one type of cell. For example, wireless terminal may be capable of connecting to a Wireless Local Area Network (WLAN) cell or a cellular Radio Access Technology (RAT) (e.g., LTE). WLAN may be used interchangeably with "WiFi" and both may encompass or refer to IEEE 802.11 protocols. Cellular RATs may be further classified as Closed Subscriber Group (CSG) and non-CSG types. A CSG cell is limited to services a set of terminals associated with user accounts appearing in the CSG cell's access control list. A non-CSG cell does not use an access control list and may therefore service any terminal authorized by the operator (e.g., any subscriber or authorized roaming device). In many situations, more than one type of cell may be available to a terminal at any given time.

For example, in the Evolved Packet System (EPS), the Access Network Discovery and Selection Function (ANDSF) has defined methods for devices to determine which access technology is preferable for certain Internet Protocol (IP) traffic under specific condition, such as through the use of Inter-System Routing Policy (ISRP). ANDSF does not provide for methods to indicate preferences with granularity at the 3rd Generation Partnership Project (3GPP) RAT level within network policies. For example, it is not possible to distinguish between different types of cellular RATs and/or cells. This restricts the ability for the operator to provide policies that favor a specific 3GPP RAT over another one with reference to the WLAN preference. It would be desirable to remove this restriction for reasons that should be apparent from the disclosure that follows.

SUMMARY

Methods, apparatus and systems for prioritizing radio access types for closed subscriber group cells of a wireless communication system are described in detail in the detailed description, and certain aspects are summarized below. This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

A method by a network entity for prioritizing radio access types for closed subscriber group cells of a wireless communication system may include storing priority information by a network entity, the priority information defining, for each of one or more types of data traffic, a priority ranking of cell types, the cell types comprising at least one of different wireless technologies and different access control types. The different access control types may include a Closed Subscriber Group (CSG) mode, a hybrid mode and an open mode. The one or more types of data traffic may include Internet Protocol (IP) traffic. The method may further include indicating the priority information to a mobile device capable of using the different wireless technologies or different access control types to connect to cells of a wireless communications system.

In an aspect of the method, the different wireless technologies may include Wireless Local Area Network (WLAN) and at least one cellular mobile phone Radio Access Technology (RAT). The at least one cellular mobile phone RAT may be, or may include, a 3rd Generation Partnership Project (3GPP) RAT. The 3GPP RAT may be at least one of Universal Mobile Telecommunications System (UMTS), GSM EDGE Radio Access Network (GERAN) and Evolved UMTS Terrestrial Radio Access (E-UTRA).

In other aspects, the different access control types may include Closed Subscriber Group (CSG) member and CSG non-member. The priority information may specify a priority between any CSG member cell and other wireless technologies, or may specify a priority between any CSG member cell and other access control types. The priority information may include an indication of a specific CSG member cell using a cellular mobile phone Radio Access Technology (RAT). The priority information may specify that the specific CSG member cell is assigned a specific position in the priority ranking. The priority information may further specify that a Wireless Local Area Network (WLAN) cell is ranked below the specific CSG member cell. The priority information may further specify that a non-CSG cell using the cellular RAT is ranked below the WLAN cell.

In another aspect, a method by a mobile entity for using a priority of radio access types for closed subscriber group cells of a wireless communication system may include receiving priority information from a network entity, the priority information defining, for each of one or more types of data traffic, a priority ranking of cell types, the cell types comprising at least one of different wireless technologies and different access control types. The method may further include selecting a cell to connect to or camp on based on the priority information. The different wireless technologies, the one or more types of data traffic, the different access control types, and the priority information may be as summarized above for the method performed by the network entity. In another aspect of the method, selecting the cell may be further based on a current type of data traffic.

In related aspects, a wireless communication apparatus may be provided for performing any of the methods and aspects of the methods summarized above. An apparatus may include, for example, a processor coupled to a memory, wherein the memory holds instructions for execution by the processor to cause the apparatus to perform operations as described above. Certain aspects of such apparatus (e.g., hardware aspects) may be exemplified by equipment such as a network entity, for example, an access point, a picocell, femtocell, Home Node B, or other small cell, or a Node B; or in the alternative, by a mobile entity, such as a user equipment (UE) or access terminal. In some aspects, several network entities may operate interactively in a peer-to-peer fashion to perform aspects of the technology as described herein. Similarly, an article of manufacture may be provided, including a computer-readable storage medium holding encoded instructions, which when executed by a processor, cause a network entity or mobile entity to perform the methods and aspects of the methods as summarized above.

BRIEF DESCRIPTION OF THE DRAWINGS

The present application may be more fully appreciated in connection with the following detailed description taken in conjunction with the accompanying drawings.

DETAILED DESCRIPTION

This disclosure relates generally to providing or participating in prioritizing radio access types for CSG cells in wireless communications systems, also referred to as wireless communications networks. In various embodiments, the techniques and apparatus described herein may be used for wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, LTE networks, GSM networks, as well as other communications networks. As described herein, the terms "networks" and "systems" may be used interchangeably.

A CDMA network may implement a radio technology such as Universal Terrestrial Radio Access (UTRA), CDMA2000, and the like. UTRA includes Wideband-CDMA (W-CDMA) and Low Chip Rate (LCR). CDMA2000 covers IS-2000, IS-95, and IS-856 standards.

A TDMA network may implement a radio technology such as Global System for Mobile Communications (GSM). 3GPP defines standards for the GSM EDGE (Enhanced Data Rates for GSM Evolution) Radio Access Network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the Public Switched Telephone Network (PSTN) and Internet to and from subscriber handsets, also knows as user terminals or user equipments (UEs). A mobile phone operator's network may comprise one or more GERANs, which may be coupled with UTRANs in the case of a UMTS/GSM network. An operator network may also include one or more LTE networks, and/or one or more other networks. The various different network types may use different Radio Access Technologies (RATs) and Radio Access Networks (RANs).

An OFDMA network may implement a radio technology such as Evolved UTRA (E-UTRA), IEEE 802.11, IEEE 802.16, IEEE 802.20, Flash-OFDM and the like. UTRA, E-UTRA, and GSM are part of Universal Mobile Telecommunication System (UMTS). In particular, Long Term Evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems, and mobile devices. For clarity, certain aspects of the apparatus and techniques may be described below for LTE implementations or in an LTE-centric way, and LTE terminology may be used as illustrative examples in portions of the description below; however, the description is not intended to be limited to LTE applications. Accordingly, it may be apparent to one of skill in the art that the systems, apparatus and methods described herein may be applied to other communications systems and applications.

In LTE implementations, orthogonal frequency division multiplexing (OFDM) is used for the downlink—that is, from a base station, access point or eNodeB (eNB) to a user terminal or UE. Use of OFDM meets the LTE requirement for spectrum flexibility and enables cost-efficient solutions for very wide carriers with high peak rates, and is a well-established technology. For example, OFDM is used in standards such as IEEE 802.11a/g, 802.16, High Performance Radio LAN-2 (HIPERLAN-2, wherein LAN stands for Local Area Network) standardized by the European Telecommunications Standards Institute (ETSI), Digital Video Broadcasting (DVB) published by the Joint Technical Committee of ETSI, and other standards.

Time frequency physical resource blocks (also denoted here in as resource blocks or "RBs" for brevity) may be defined in OFDM systems as groups of transport carriers (e.g. sub-carriers) or intervals that are assigned to transport data. The RBs are defined over a time and frequency period. Resource blocks are comprised of time-frequency resource elements (also denoted here in as resource elements or "REs" for brevity), which may be defined by indices of time and frequency in a slot. Additional details of LTE RBs and REs are described in the 3GPP specifications, such as, for example, 3GPP TS 36.211.

UMTS LTE supports scalable carrier bandwidths from 20 MHz down to 1.4 MHZ. In LTE, an RB is defined as 12 sub-carriers when the subcarrier bandwidth is 15 kHz, or 24 sub-carriers when the sub-carrier bandwidth is 7.5 kHz. In an exemplary implementation, in the time domain there is a defined radio frame that is 10 ms long and consists of 10 subframes of 1 millisecond (ms) each. Every subframe consists of 2 slots, where each slot is 0.5 ms. The subcarrier spacing in the frequency domain in this case is 15 kHz. Twelve of these subcarriers together (per slot) constitutes an RB, so in this implementation one resource block is 180 kHz. 6 Resource blocks fit in a carrier of 1.4 MHz and 100 resource blocks fit in a carrier of 20 MHz.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Figure 1:
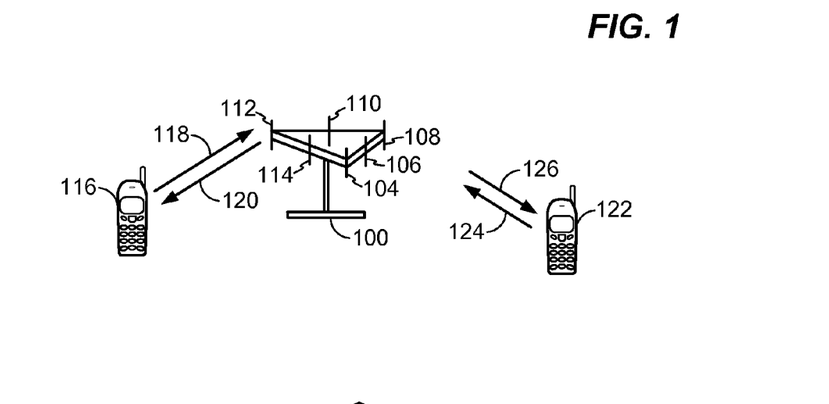
FIG. 1 illustrates details of a wireless communication system.

FIG. 1 illustrates details of an implementation of a multiple access wireless communication system, which may be an LTE system, on which aspects as further described subsequently may be implemented. An evolved NodeB (eNB) 100 (also know as a base station, access point or AP) may include multiple antenna groups, one including 104 and 106, another including 108 and 110, and an additional including 112 and 114. In FIG. 1, only two antennas are shown for each antenna group; however, more or fewer antennas may be utilized for each antenna group. A user equipment (UE) 116 (also known as a mobile device, mobile entity, user terminal, access terminal, or AT) is in communication with antennas 112 and 114, where antennas 112 and 114 transmit information to UE 116 over forward link (also known as a downlink) 120 and receive information from UE 116 over reverse link (also known as an uplink) 118. A second UE 122 may be in communication with antennas 104 and 106, where antennas 104 and 106 transmit information to UE 122 over forward link 126 and receive information from access terminal 122 over reverse link 124.

In a frequency division duplex (FDD) system, communication links 118, 120, 124 and 126 may use different frequencies for communication. For example, forward link 120 may use a different frequency then that used by reverse link 118. In a time division duplex (TDD) system, downlinks and uplinks may be shared.

Each group of antennas and/or the area in which they are designed to communicate is often referred to as a sector of the eNB. Antenna groups each are designed to communicate to UEs in a sector of the areas covered by eNB 100. In communication over forward links 120 and 126, the transmitting antennas of eNB 100 utilize beamforming in order to improve the signal-to-noise ratio of forward links for the different access terminals 116 and 122. Also, an eNB using beamforming to transmit to UEs scattered randomly through its coverage causes less interference to UEs in neighboring cells than an eNB transmitting through a single antenna to all its UEs. An eNB may be a fixed station used for communicating with the UEs and may also be referred to as an access point, a Node B, or some other equivalent terminology. A UE may also be called an access terminal, AT, user equipment, wireless communication device, terminal, or some other equivalent terminology. UEs, such as UE 116 and 122, may be further configured to operate with other nodes of other communication networks (not shown), such as, for example, GERAN and/or UTRAN networks. Moreover, base stations, such as eNB 100, may be configured to facilitate handover of served UEs to base stations of the other networks, such as through use of a redirection command.

Figure 2:
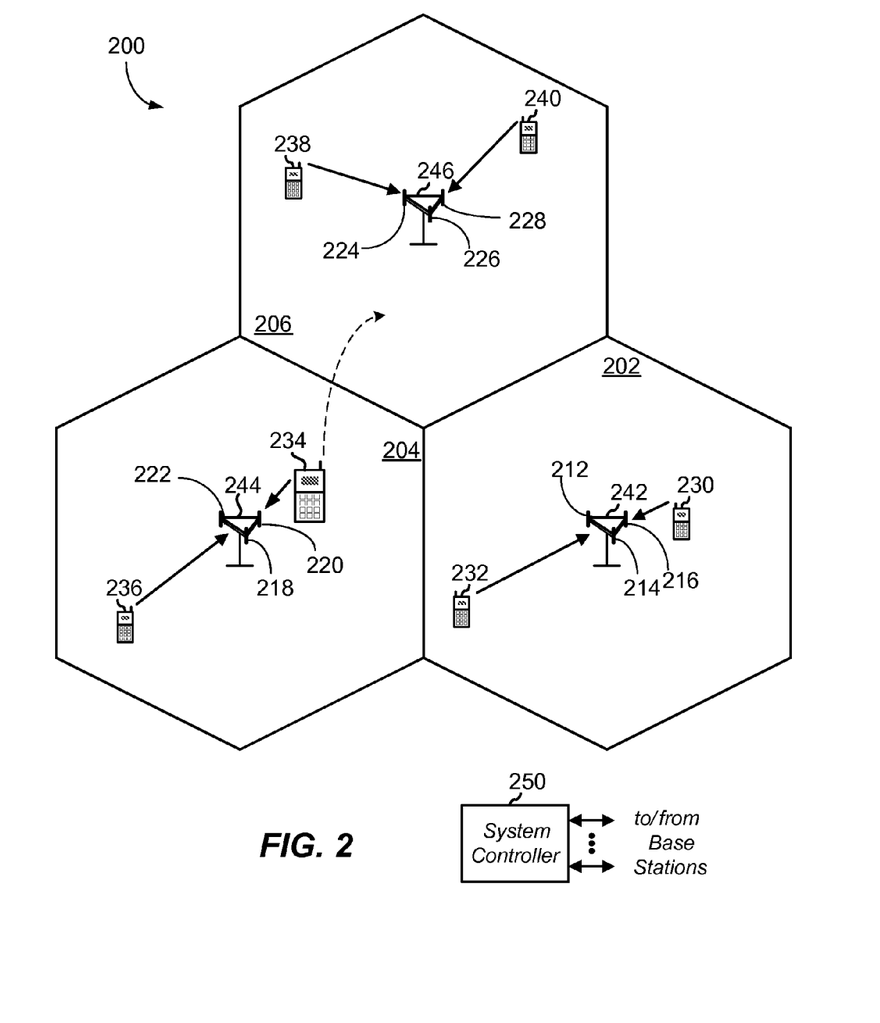
FIG. 2 illustrates details of a wireless communication system having multiple cells.

FIG. 2 illustrates details of an implementation of a multiple access wireless communication system 200, such as an LTE system, on which aspects, such as are described subsequently herein, may be implemented. The multiple access wireless communication system 200 includes multiple cells, including cells 202, 204, and 206. In one aspect, the cells 202, 204, and 206 may include an eNB that includes multiple sectors. The multiple sectors can be formed by groups of antennas with each antenna responsible for communication with UEs in a portion of the cell. For example, in cell 202, antenna groups 212, 214, and 216 may each correspond to a different sector. In cell 204, antenna groups 218, 220, and 222 each correspond to a different sector. In cell 206, antenna groups 224, 226, and 228 each correspond to a different sector. The cells 202, 204, and 206 can include several wireless communication devices, e.g., user equipment or UEs, which can be in communication with one or more sectors of each cell 202, 204, or 206. For example, UEs 230 and 232 can be in communication with eNB 242, UEs 234 and 236 can be in communication with eNB 244, and UEs 238 and 240 can be in communication with eNB 246. The cells and associated base stations may be coupled to a system controller 250, which may be part of a core or backhaul network or may provide connectivity to a core or backhaul network, including, for example, an MME and SGW, such as may be used to perform certain core network functions.

An operator's system may include multiple networks, which may be of multiple types (for example, in addition to the LTE network configurations shown in FIGS. 2 and 3) using different RATs, or of the same type. For example, one type may be an LTE system, which is data-centric. Another type may be a UTRAN system, such as a W-CDMA system. Yet another type may be a GERAN system, which may in some cases be Dual Transfer Mode (DTM) capable (also denoted herein as a DTM GERAN). Some GERAN networks may be non-DTM capable. Multimode user terminals, such as UEs, may be configured to operate in multiple networks, such as these, as well as other (e.g., WiFi or WiMax networks, etc.). In addition, connectivity may be provided between one operator's networks and another operator's networks, to support features such as roaming or other services provided by different networks.

It may be desirable to enable an operator to provide policies to a device (e.g., a mobile entity) that allow the device to determine whether WLAN is preferable to specific 3GPP RATs, and vice versa. In some scenarios, an operator may decide that the preference between routing specific IP traffic either over a 3GPP RAT or WLAN should also depend on the type of 3GPP cell. Specifically, the operator may give preference to a CSG member cell over WLAN, but determine that WLAN is preferable to a non-CSG cell of the same 3GPP technology or of any 3GPP access technology. As an example, E-UTRAN CSG X may be preferable to WLAN, while WLAN may be preferable to E-UTRAN. In such scenarios, the operator may desire to indicate to the UE what is the priority between WLAN, CSG member cells (i.e. specific CSG member cells for which the operator provides the CSG identity, or any CSG member cells), and non-CSG cells. Aspects of the present disclosure enable such indication.

For further example, an operator may determine that, for certain IP traffic, an LTE CSG X cell is preferable to WLAN, but WLAN is preferable to LTE. In this scenario, the operator may indicate to the UE (e.g. in configuration policies, etc.) what is the priority between WLAN, CSG member cells (i.e. specific CSG member cells for which the operator provides the CSG identity, or any CSG member cells), and non-CSG cells. When an ANDSF rule becomes active, and the rule contains preferences between different RAT types and cell types (e.g. CSG member cells, etc.) and possibly cell identities (e.g. the CSG identity of a CSG member cell, etc.), the device verifies the type of cell it is connected to or camping on (and possibly the cell identity), and depending on whether it is a CSG member cell or not (and optionally the CSG ID), it determines the preference for the different types of RATs.

To enable this solution, solution ANDSF rules may be enhanced to enable the operator to provide policies that distinguish cell types optionally in connection with traffic types. For example, an ANDSF management object (MO) in 3GPP TS 24.312 may be extended. Previously, the MO indicated the priority/preference of access technologies according to the following leaf: Occurrence: One; Format: int; Access Types: Get, Replace; Values: <Access technology>. Possible values for the Access technology are specified in Table I.

TABLE I

| Possible values for the Access Technology leaf | |
|---|---|
| Value | Description |
| 0 | Reserved |

TABLE I-continued

| Possible values for the Access Technology leaf | |
|---|---|
| Value | Description |
| 1 | 3GPP |
| 2 | Reserved |
| 3 | WLAN |
| 4 | WiMAX |
| 5-255 | Reserved |

This leaf may be modified to enable the operator to express the preference of the type of cell, either by providing an indication of CSG member cell (independently of the CSG identity), or one or more CSG IDs. Such information may be provided together with (for example) the RAT type. The identity of the cell may be provided only if the cell type is set to CSG member cell. When a rule becomes active, the device may verify the type of cell it is connected to or camping on, and depending on whether it is a CSG member cell or not (and optionally the CSG ID), determine the preference for the different types of RATs.

EXAMPLE METHODOLOGIES AND APPARATUS

By way of example, methodologies that may be implemented in accordance with the disclosed subject matter may be better appreciated with reference to various flow charts. For purposes of simplicity of explanation, methodologies are shown and described as a series of acts/operations. However, the claimed subject matter is not limited by the number or order of operations, as some operations may occur in different orders and/or at substantially the same time with other operations from what is depicted and described herein. Moreover, not all illustrated operations may be required to implement methodologies described herein. It is to be appreciated that functionality associated with operations may be implemented by software, hardware, a combination thereof or any other suitable means (e.g., device, system, process, or component). Additionally, it should be further appreciated that methodologies disclosed throughout this specification are capable of being stored as encoded instructions and/or data on an article of manufacture to facilitate transporting and transferring such methodologies to various devices. Those skilled in the art may understand and appreciate that a method could alternatively be represented as a series of interrelated states or events, such as in a state diagram.

Figure 3:
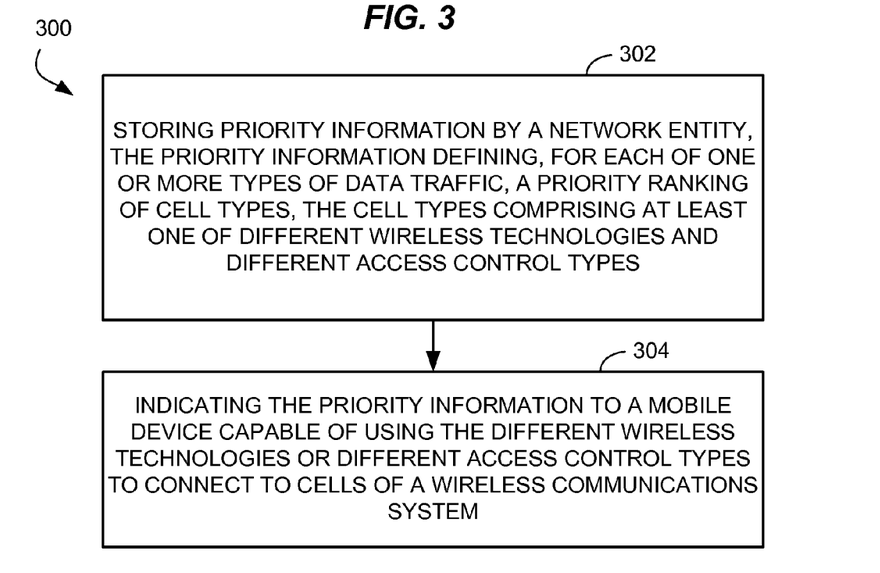
FIG. 3 illustrates an example embodiment of a process for providing information for prioritizing radio access types for CSG cells by a network device.

FIG. 3 illustrates an embodiment of an example process 300 that may be implemented by a network entity, for example an access point, base station, femto cell, or eNB, for enabling a mobile entity to prioritize radio access types for CSG cells in a wireless communications systems. The method 300 may include, at 302, providing storing priority information by a network entity, the priority information defining, for each of one or more types of data traffic, a priority ranking of cell types, the cell types comprising at least one of different wireless technologies and different access control types. For example, a network entity may receive priority information from operator input. In the alternative, or in addition, the network entity or another network node may operate an algorithm that defines priority information according to an operator-defined scheme in different scenarios. In some embodiments, the cell types may consist exclusively of different wireless technologies. In other embodiments, the cell types may consist exclusively of different access control types, or of both different wireless technologies and different access control types.

The method 300 may further include, at 304, indicating the priority information to a mobile device capable of using the different wireless technologies or different access control types to connect to cells of a wireless communications system. For example, the network entity may transmit the priority information to the mobile device using a control channel, or as part of system information. The network entity may provide the priority information in response to a request from a mobile entity, or in response to some other predefined event such as, for example, an initial set-up procedure.

Figure 4:
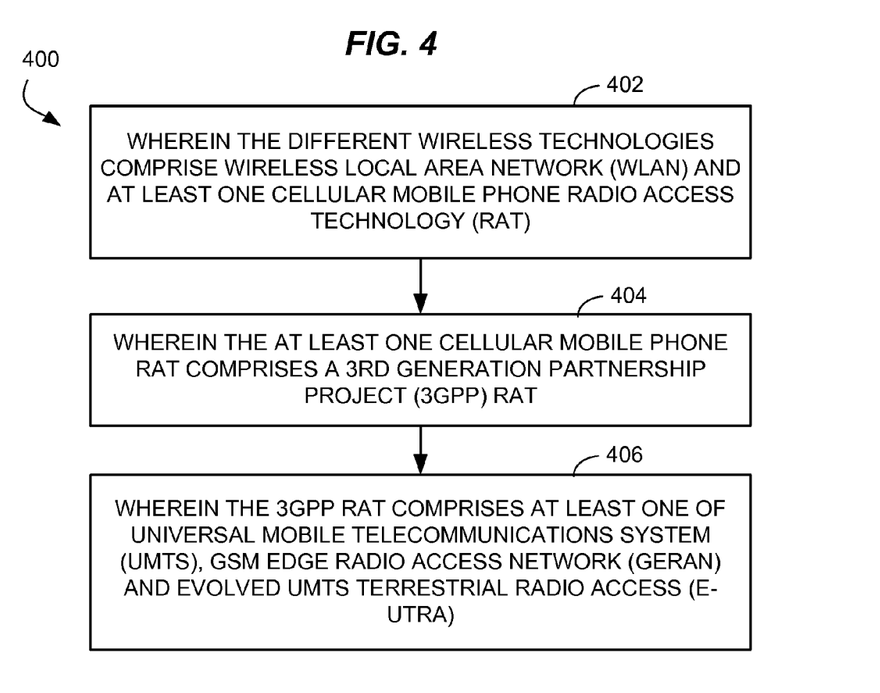
FIGS. 4-6 illustrate various aspects of the process illustrated in FIG. 3 or FIG. 8.
Figure 5:
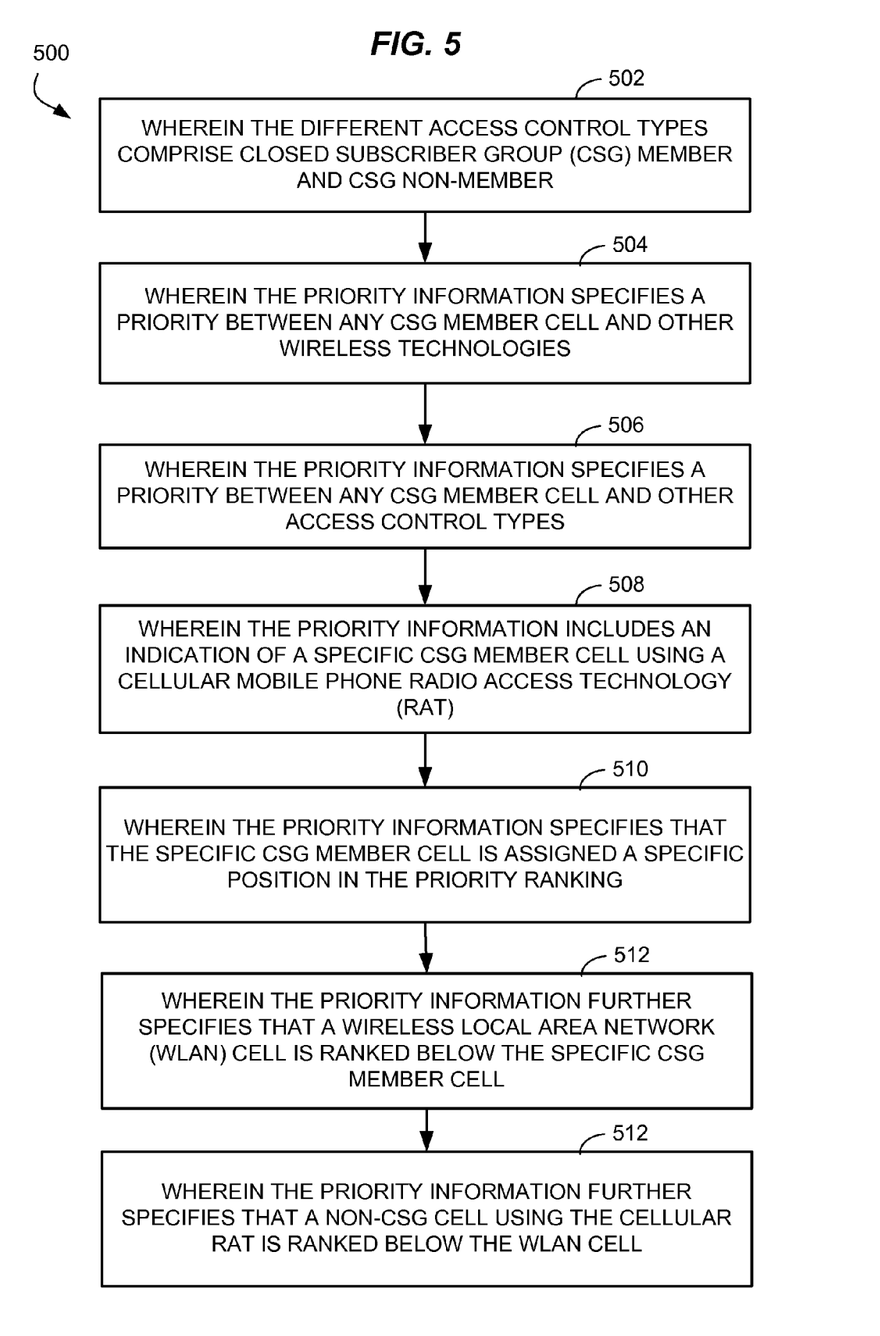
Figure 6:
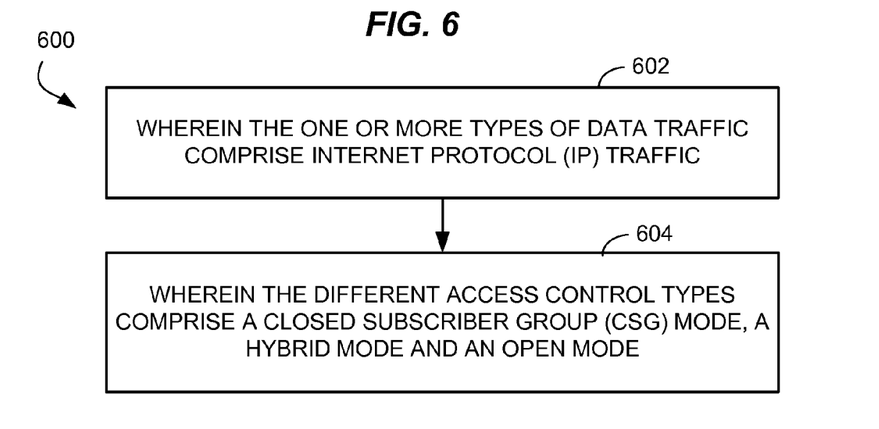

Additional aspects 400-600 are illustrated in FIGS. 4-6, for modifying the elements of method 300 by the network entity. One or more of the aspects 400-600 may optionally be incorporated in method 300. Certain of the aspects may be independently incorporated and are not mutually exclusive. Therefore any one of such aspects may be incorporated regardless of whether another downstream or upstream aspect is incorporated. For example, if the method 300 includes at least one of the aspects 400-600, then the method 300 does not necessarily include any subsequent downstream aspect(s) that may be illustrated.

Referring to FIG. 4, elements of the method 300 may incorporate one or more additional aspects 400. In an aspect, the different wireless technologies in method 300 may comprise, at 402, Wireless Local Area Network (WLAN) and at least one cellular mobile phone Radio Access Technology (RAT). As used herein, WLAN may include WiFi. Examples of cellular mobile phone RATs may making up the different cellular RATs may include, at 404, a 3rd Generation Partnership Project (3GPP) RAT. In turn, 3GPP RATs for which priority information may be stored by the network entity may include, for example, at least one of Universal Mobile Telecommunications System (UMTS), GSM EDGE Radio Access Network (GERAN) and Evolved UMTS Terrestrial Radio Access (E-UTRA), as shown at 406.

Referring to FIG. 5, the method 300 may include one or more additional aspects 500 of the priority information stored and provided by method 300. In an aspect, the priority information of the method 300 may related to the different access control types, wherein, at 502, the different access control types comprise Closed Subscriber Group (CSG) member and CSG non-member. That is, the priority information may define a priority rank based on whether or not a cell is broadcasting an identity of a selected Public Land Mobile Network (PLMN), registered PLMN or equivalent PLMN for which the CSG whitelist of the UE to which the priority information is provided includes an entry comprising of cell's CSG ID and the respective PLMN identity. It should be appreciated that the CSG member and non-member types may exist independently of CSG, hybrid, or open mode types. Accordingly, in an aspect of method 300, at 504, the priority information specifies a priority between any CSG member cell and other wireless technologies. That is, for example, a CSG member cell (or non-member) may be assigned a priority irrespective of wireless technology type. Similarly, in another aspect of method 300, at 506, the priority information may specify a priority between any CSG member cell and other access control types. That is, for example, a CSG member cell (or non-member) may be assigned a priority irrespective of access control mode. In an alternative aspect of method 300, at 508, the priority information may include an indication of a specific CSG member cell using a cellular mobile phone Radio Access Technology (RAT). For example, the network entity may assign a specified priority (e.g., first, second, etc.) to a CSG member cell using E-UTRA, GERAN, or UMTS.

In another aspect of method 300, at 510, the priority information may specify that the specific CSG member cell is assigned a specific position in the priority ranking (e.g., first, second, last, etc.). In some embodiments, a specific CSG member cell may be assigned first priority, so that the mobile entity will connect to the CSG member cell, at least for a specified traffic type, whenever the CSG member cell is available. In addition, at 512, the priority information may specify that a Wireless Local Area Network (WLAN) cell is ranked below the specific CSG member cell. For example, the network entity may specify that the mobile entity not connect to the WLAN cell unless the CSG member cell in unavailable. For further example, at 514, the priority information may specify that a non-CSG cell using the cellular RAT is ranked below the WLAN cell. Thus, for example, the network entity may specify that the mobile entity not connect to the non-CSG cellular RAT cell unless both the WLAN cell and CSG member cell are unavailable.

Referring to FIG. 6, the method 300 may include one or more additional aspects 600 traffic types or access control types specified by the priority information. In an aspect, at 602, the one or more types of data traffic specified by the priority information may include an Internet Protocol (IP) traffic type. For example, IP traffic may be handled using a different priority ranking than applied for other traffic types. In another aspect, at 604, the different access control types may include a CSG mode, a hybrid mode and an open mode. A Closed Subscriber Group identifies subscribers of an operator who are permitted to access one or more cells of the PLMN but which have restricted access (CSG cells). In a closed access mode, an access point (e.g., Home Node B (H(e)NB)) provides services only to its associated CSG members. In a hybrid access mode, a H(e)NB or similar access point provides services to its associated CSG members and to non-CSG members. In an open access mode, a H(e)NB or similar access point may operate as a normal NodeB or eNodeB.

Figure 7:
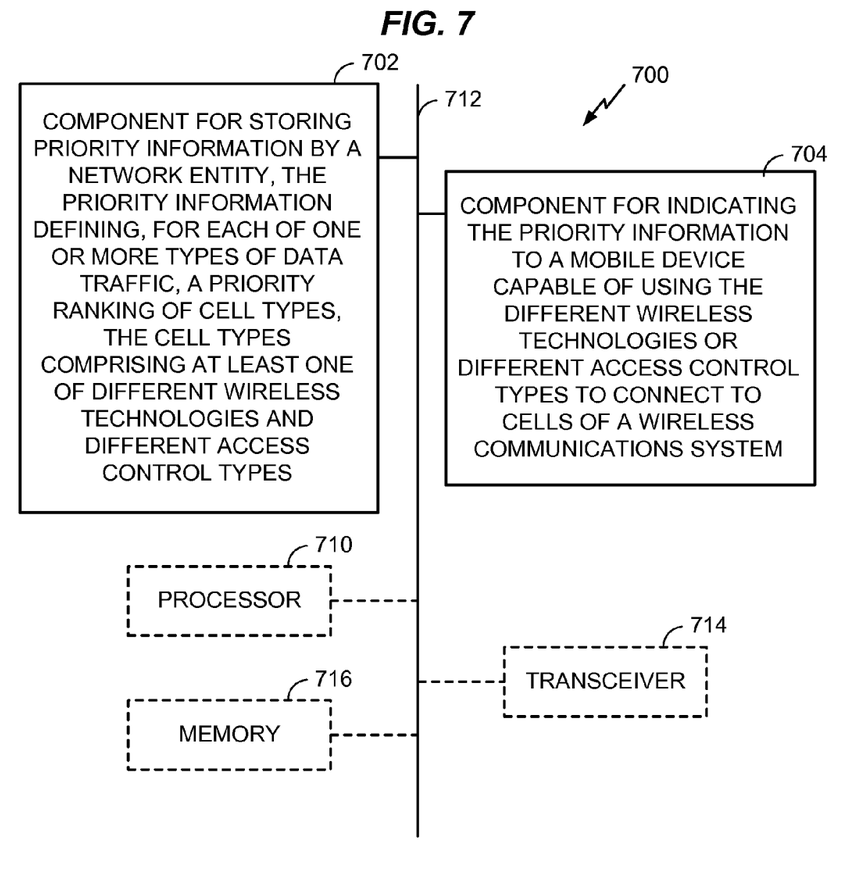
FIG. 7 illustrates an example of an apparatus for prioritizing radio access types for CSG cells based on the methodology shown in FIG. 3.

With reference to FIG. 7, there is provided an exemplary apparatus 700 that may be configured as a network entity in a wireless network, or as a processor or similar device for use within the network entity, for enabling prioritizing radio access types for CSG cells in a wireless communications system. The apparatus 700 may include functional blocks that can represent functions implemented by a processor, software, or combination thereof (e.g., firmware).

In one embodiment, the apparatus 700 may include an electrical component or module 702 for storing priority information by a network entity, the priority information defining, for each of one or more types of data traffic, a priority ranking of cell types, the cell types comprising at least one of different wireless technologies and different access control types. For example, the electrical component 702 may include at least one control processor coupled to a transceiver or the like and to a memory with instructions for receiving and storing the priority information in a data structure accessible to the network entity. The electrical component 702 may be, or may include, a means for storing priority information by a network entity, the priority information defining, for each of one or more types of data traffic, a priority ranking of cell types, the cell types comprising at least one of different wireless technologies and different access control types. Said means may be or may include the at least one control processor operating an algorithm. The algorithm may operate in an application to receive the priority information over a radio link or wired backhaul, processing the information to recognize and classify it, and causing the information to be stored in a computer memory accessible to the processor.

The apparatus 700 may include an electrical component 704 for indicating the priority information to a mobile device capable of using the different wireless technologies or different access control types to connect to cells of a wireless communications system. For example, the electrical component 704 may include at least one control processor coupled to a memory holding instructions for transmitting a message including the priority information over a radio link to a mobile entity, formatted so that the mobile entity can recognize and operate based on the information. The processor may provide the indicators, optionally with other information, to the mobile device to enable it to select an optimal cell. The electrical component 704 may be, or may include, a means for providing the priority information as described. Said means may be or may include the at least one control processor operating an algorithm. The algorithm may operate in an application memory to generate message for the priority information and to transmit the information over a radio link to a mobile entity. The apparatus 700 may include similar electrical components for performing any or all of the elements of method 300 according to the additional aspects 400, 500 or 600 described in connection with FIGS. 4-6, which for illustrative simplicity are not shown in FIG. 7.

In related aspects, the apparatus 700 may optionally include a processor component 710 having at least one processor, in the case of the apparatus 700 configured as a network entity. The processor 710, in such case, may be in operative communication with the components 702-704 or similar components via a bus 712 or similar communication coupling. The processor 710 may effect initiation and scheduling of the processes or functions performed by electrical components 702-704. The processor 710 may encompass the components 702-704, in whole or in part. In the alternative, the processor 710 may be separate from the components 702-704, which may include one or more separate processors.

In further related aspects, the apparatus 700 may include a transceiver component 714 or separate transmitters and receivers. The apparatus 700 may include a component for storing information, such as, for example, a memory device/component 716. The computer readable medium or the memory component 716 may be operatively coupled to the other components of the apparatus 700 via the bus 712 or the like. The memory component 716 may be adapted to store computer readable instructions and data for performing the activity of the components 702-704, and subcomponents thereof, or the processor 710, or the additional aspects 400-600, or the methods disclosed herein. The memory component 716 may retain instructions for executing functions associated with the components 702-704. While shown as being external to the memory 716, it should be understood that the components 702-704 can exist within the memory 716.

Figure 8:
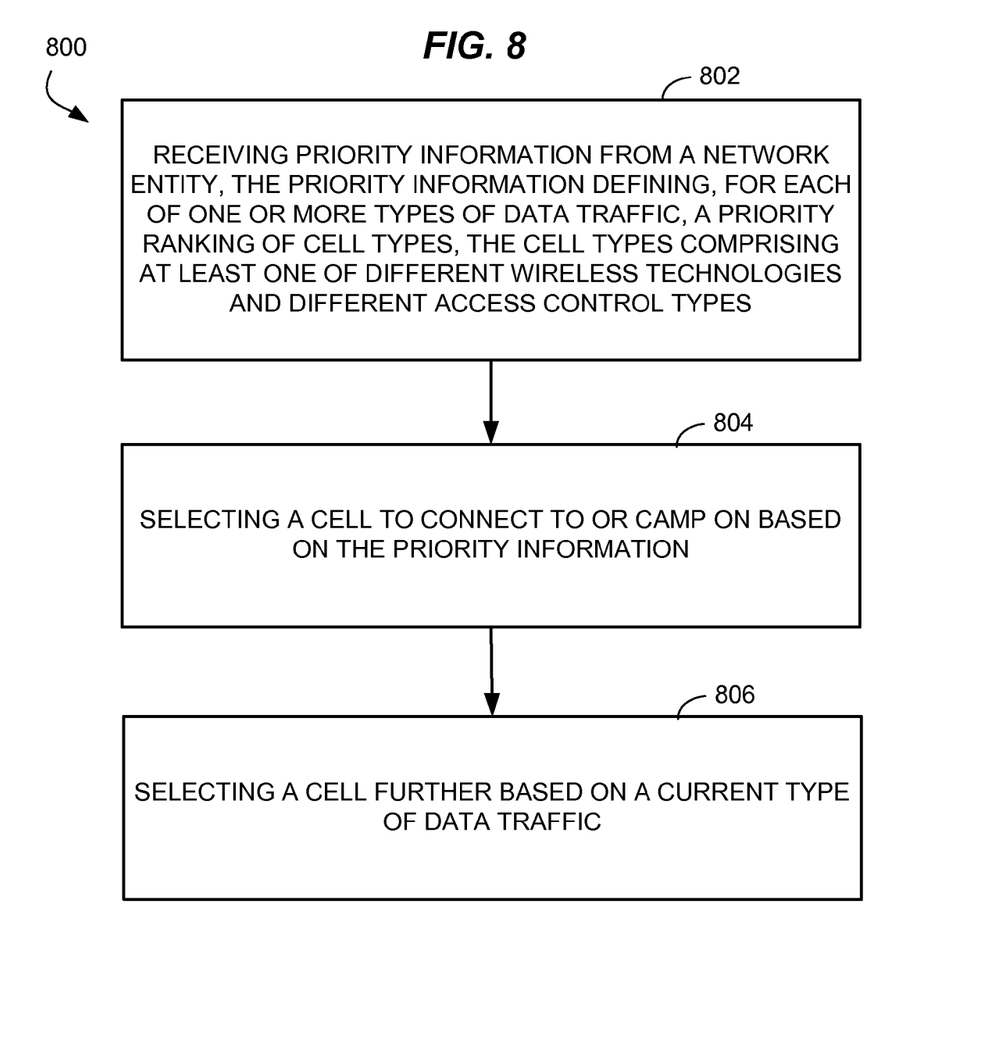
FIG. 8 illustrates an example embodiment of a process by a mobile entity for using information from a network entity for prioritizing radio access types for CSG cells.

FIG. 8 illustrates an embodiment of an example process 800 that may be implemented by a mobile device, for example an access terminal, UE, or mobile entity, for enabling prioritizing radio access types for CSG cells in a wireless communications systems. The method 800 may include, at 802, receiving priority information from a network entity, the priority information defining, for each of one or more types of data traffic, a priority ranking of cell types, the cell types comprising at least one of different wireless technologies and different access control types. The method 800 may further include, at 804, selecting a cell to connect to or camp on based on the priority information. For example, the mobile entity may execute a cell selection algorithm using the priority information as input or part of the input. The output from the algorithm may be an indication of whether or not to select a cell, or an identifier for a cell to which a connection should first be attempted. The mobile entity may use the priority information to connect to a cell, or in the alternative, to merely camp on a cell. In an optional operation 806, the operation of selecting a cell may be further based on a current type of data traffic. That is, different priority information may be defined for different data traffic type.

The method 800 may include any or all of the additional aspects 400-600 described in connection with FIGS. 4-6 above, which may be applied mutatis mutandis to the operations performed by the mobile entity as the recipient and end user of the priority information supplied by the network entity.

Figure 9:
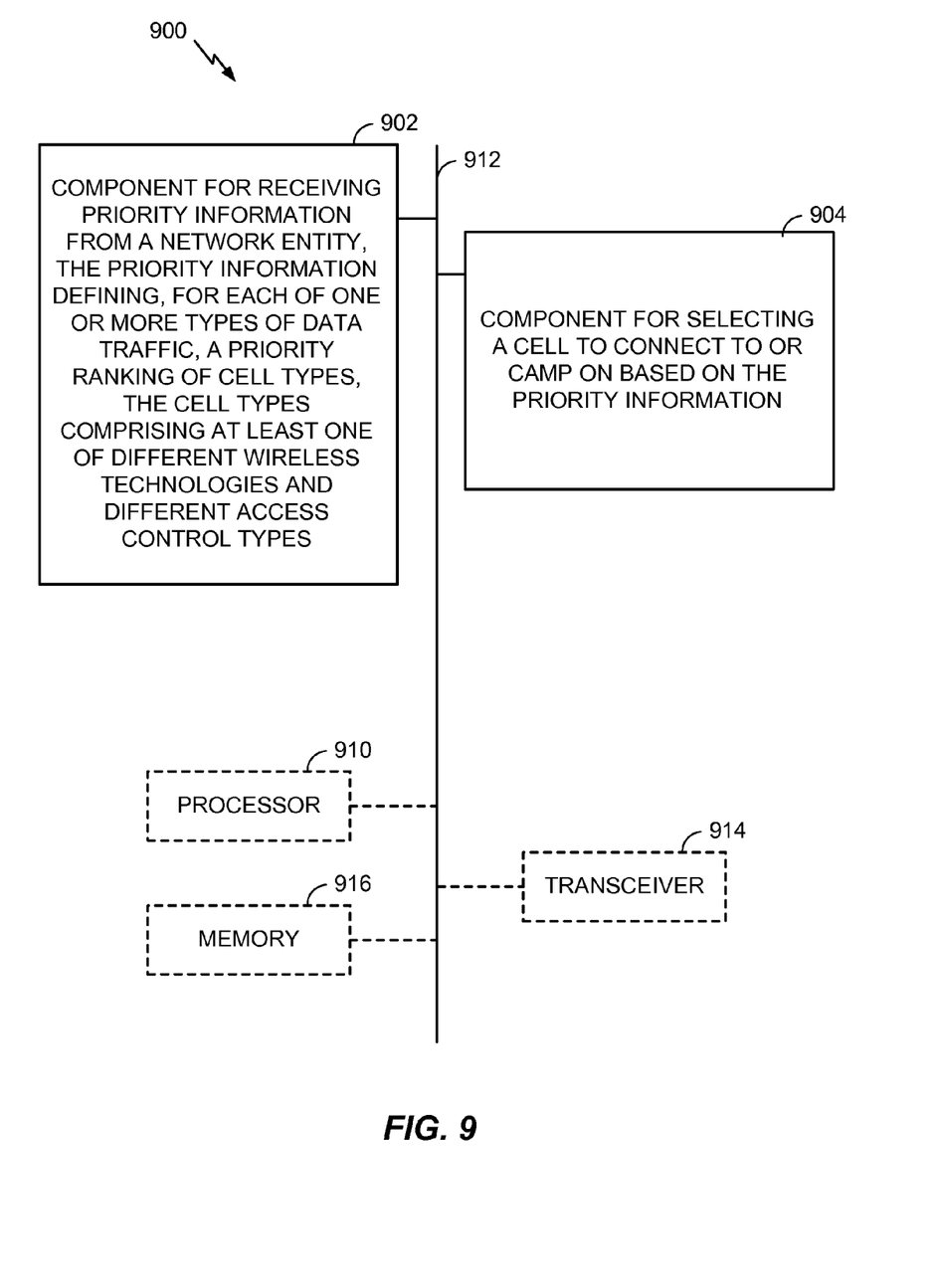
FIG. 9 illustrates an example of an apparatus for prioritizing radio access types for CSG cells consistent with the methodology shown in FIG. 8.

With reference to FIG. 9, there is provided an exemplary apparatus 900 that may be configured as a mobile entity in a wireless network, or as a processor or similar device for use within the mobile entity, for obtaining prioritizing radio access types for CSG cells in a wireless communications system. The apparatus 900 may include functional blocks that can represent functions implemented by a processor, software, or combination thereof (e.g., firmware).

In one embodiment, the apparatus 900 may include an electrical component or module 902 for receiving priority information from a network entity, the priority information defining, for each of one or more types of data traffic, a priority ranking of cell types, the cell types comprising at least one of different wireless technologies and different access control types. For example, the electrical component 902 may include at least one control processor coupled to a transceiver or the like and to a memory with instructions for receiving the information in a message according to a defined interface, or by accessing a data structure. The electrical component 902 may be, or may include, a means for receiving priority information from a network entity, the priority information defining, for each of one or more types of data traffic, a priority ranking of cell types, the cell types comprising at least one of different wireless technologies and different access control types. Said means may be or may include the at least one control processor operating an algorithm. The algorithm may operate in an application to receive and process a message over a radio link, by accessing a data record maintained by the communication network, or otherwise causing a data signal encoding the first information to be processed so as to obtain the information in a processor memory, and processing the message to recognize priority information for connecting to different cell types as more particularly described elsewhere herein.

The apparatus 900 may include an electrical component 904 for selecting a cell to connect to or camp on based on the priority information. For example, the electrical component 904 may include at least one control processor coupled to a memory holding instructions for selecting a cell to connect to, based at least in part on the priority information. The electrical component 904 may be, or may include, a means for selecting a cell to connect to or camp on based on the priority information. Said means may be or may include the at least one control processor operating an algorithm. The algorithm may operate in an application memory to determine, from available cells to connect or camp on, which is the most preferred cell, based on the supported priority information. A great variety of different algorithms for making this determination are possible. For example, the algorithm may sort a list of available cells based on a ranking scheme, of which different examples are provided above in connection with FIG. 5.

The apparatus 900 may include similar electrical components for performing the method 800 incorporating the additional aspects 400-600 described in connection with FIGS. 4-6, which for illustrative simplicity are not shown in FIG. 9.

In related aspects, the apparatus 900 may optionally include a processor component 910 having at least one processor, in the case of the apparatus 900 configured as a mobile entity. The processor 910, in such case, may be in operative communication with the components 902-904 or similar components via a bus 912 or similar communication coupling. The processor 910 may effect initiation and scheduling of the processes or functions performed by electrical components 902-904. The processor 910 may encompass the components 902-904, in whole or in part. In the alternative, the processor 910 may be separate from the components 902-904, which may include one or more separate processors.

In further related aspects, the apparatus 900 may include a transceiver component 914 or separate transmitters and receivers. The apparatus 900 may include a component for storing information, such as, for example, a memory device/component 916. The computer readable medium or the memory component 916 may be operatively coupled to the other components of the apparatus 900 via the bus 912 or the like. The memory component 916 may be adapted to store computer readable instructions and data for performing the activity of the components 902-904, and subcomponents thereof, or the processor 910, or the additional aspects 400-600, or the methods disclosed herein. The memory component 916 may retain instructions for executing functions associated with the components 902-904. While shown as being external to the memory 916, it should be understood that the components 902-904 can exist within the memory 916.

In one or more exemplary embodiments, the functions, methods and processes described may be implemented in hardware, software, firmware, or any combination thereof. If implemented in software, the functions may be stored on or encoded as one or more instructions or code on a non-transitory computer-readable medium. Non-transitory computer-readable media includes computer storage media. Storage media may be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually contain magnetically encoded data, while discs contain optically encoded data. Combinations of the above should also be included within the scope of computer-readable media.

It is understood that the specific order or hierarchy of steps or stages in the processes and methods disclosed are examples of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In some implementations, processors may be processors, such as communication processors, specifically designed for implementing functionality in communication devices or other mobile or portable devices.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory computer-readable storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects may be readily apparent to those skilled in the art, and the principles defined herein may be applied to other aspects without departing from the spirit or scope of the disclosure. Thus, the disclosure is not intended to be limited to the aspects shown herein but is to be accorded the widest scope consistent with the principles and novel features disclosed herein. It is intended that the following claims and their equivalents define the scope of the disclosure.

What is claimed is:

1. A method by a network entity for wireless communication, the method comprising:
   storing priority information by the network entity, the priority information defining a priority ranking of cell types, wherein the cell types comprise at least one of different wireless technologies or different access control types, wherein the different access control types comprise a non-Closed Subscriber Group (CSG) type, wherein the priority information specifies a priority of the non-CSG type relative to a wireless technology of the different wireless technologies, wherein the priority of the non-CSG type relative to the wireless technology indicates that a first cell, of the non-CSG type, is ranked in relation to a second cell that uses the wireless technology, wherein the priority ranking is a first priority ranking for a first type of data traffic, and wherein the priority information further defines a second, different priority ranking for a second type of data traffic; and
   indicating the priority information to a mobile device using the different wireless technologies or the different access control types to connect to cells of a wireless communications system.

2. The method of claim 1, wherein the different wireless technologies comprise a Wireless Local Area Network (WLAN) and at least one cellular mobile phone Radio Access Technology (RAT).

3. The method of claim 2, wherein the at least one cellular mobile phone RAT comprises a 3rd Generation Partnership Project (3GPP) RAT.

4. The method of claim 3, wherein the 3 GPP RAT comprises at least one of a Universal Mobile Telecommunications System (UMTS), a GSM EDGE Radio Access Network (GERAN), or Evolved UMTS Terrestrial Radio Access (E-UTRA).

5. The method of claim 1, wherein the first type of data traffic comprises an Internet Protocol (IP) traffic type.

6. The method of claim 1, wherein the different access control types further comprise a CSG mode and a hybrid mode.

7. The method of claim 1, wherein the priority information further specifies a priority between any CSG member cell and other wireless technologies.

8. The method of claim 1, wherein the priority information further specifies a priority between any CSG member cell and other access control types.

9. The method of claim 1, wherein the priority information includes an indication of a specific CSG member cell using a cellular mobile phone Radio Access Technology (RAT).

10. The method of claim 9, wherein the priority information further specifies that the specific CSG member cell is assigned a specific position in the first priority ranking.

11. The method of claim 9, wherein the priority information further specifies that a Wireless Local Area Network (WLAN) cell is ranked below the specific CSG member cell.

12. A communication apparatus comprising a processor coupled to a memory and to a wireless transceiver:
   wherein the memory is configured to:
   store priority information by a network entity, the priority information defining a priority ranking of cell types, wherein the cell types comprise at least one of different wireless technologies or different access control types, wherein the different access control types comprise a non-Closed Subscriber Group (CSG) type, and wherein the priority information specifies a priority of the non-CSG type relative to a wireless technology of the different wireless technologies, wherein the priority of the non-CSG type relative to the wireless technology indicates that a first cell, of the non-CSG type, is ranked in relation to a second cell that uses the wireless technology, wherein the priority ranking is a first priority ranking for a first type of data traffic, and wherein the priority information further defines a second, different priority ranking for a second type of data traffic; and
   wherein the processor is configured to:
   indicate the priority information to a mobile device using the different wireless technologies or the different access control types to connect to cells of a wireless communications system.

13. The communication apparatus of claim 12, wherein the priority is associated with indication of another cell, of the non-CSG type, using a cellular mobile phone Radio Access Technology (RAT) of the different wireless technologies.

14. The communication apparatus of claim 12, wherein the wireless technology is Wireless Local Area Network (WLAN) technology.

15. A method by a mobile device for wireless communication, the method comprising:
   receiving priority information from a network entity, the priority information defining a priority ranking of cell types, wherein the cell types comprise at least one of different wireless technologies or different access control types, wherein the different access control types comprise a non-Closed Subscriber Group (CSG) type, and wherein the priority information specifies a priority of the non-CSG type relative to a wireless technology of the wireless technologies, wherein the priority of the non-CSG type relative to the wireless technology indicates that a first cell, of the non-CSG type, is ranked in relation to a second cell that uses the wireless technology, wherein the priority ranking is a first priority ranking for a first type of data traffic, and wherein the priority information further defines a second, different priority ranking for a second type of data traffic; and
   selecting the first cell or the second cell to connect to or camp on based on the priority information.

16. The method of claim 15, wherein the different wireless technologies comprise a Wireless Local Area Network (WLAN) and at least one cellular mobile phone Radio Access Technology (RAT).

17. The method of claim 16, wherein the at least one cellular mobile phone RAT comprises a 3rd Generation Partnership Project (3GPP) RAT.

18. The method of claim 17, wherein the 3GPP RAT comprises at least one of a Universal Mobile Telecommunications System (UMTS), a GSM EDGE Radio Access Network (GERAN), or Evolved UMTS Terrestrial Radio Access (E-UTRA).

19. The method of claim 15, wherein the first type of data traffic comprises an Internet Protocol (IP) traffic type.

20. The method of claim 15, wherein the different access control types further comprise a CSG mode and a hybrid mode.

21. The method of claim 15, wherein the priority information further specifies a priority between any CSG member cell and other wireless technologies.

22. The method of claim 15, wherein the priority information further specifies a priority between any CSG member cell and other access control types.

23. The method of claim 15, wherein the priority information includes an indication of a specific CSG member cell using a cellular mobile phone Radio Access Technology (RAT).

24. The method of claim 23, wherein the priority information further specifies that the specific CSG member cell is assigned a specific position in the first priority ranking.

25. The method of claim 23, wherein the priority information further specifies that a Wireless Local Area Network (WLAN) cell is ranked below the specific CSG member cell.

26. The method of claim 15, wherein selecting the first cell or the second cell is further based on a current type of data traffic.

27. A communication apparatus comprising:
a wireless transceiver;
a memory; and
a processor coupled to the memory and to the wireless transceiver,
wherein the processor is configured to:
receive priority information from a network entity, a priority ranking of cell types, wherein the cell types comprise at least one of different wireless technologies or different access control types, wherein the different access control types comprise a non-Closed Subscriber Group (CSG) type, and wherein the priority information specifies a priority of the non-CSG type relative to a wireless technology of the wireless technologies, wherein the priority of the non-CSG type relative to the wireless technology indicates that a first cell, of the non-CSG type, is ranked in relation to a second cell that uses the wireless technology, wherein the priority ranking is a first priority ranking for a first type of data traffic, and wherein the priority information further defines a second, different priority ranking for a second type of data traffic; and
select the first cell or the second cell to connect to or camp on based on the priority information.

28. The communication apparatus of claim 27, wherein the priority is associated with an indication of another cell, of the non-CSG type, using a cellular mobile phone Radio Access Technology (RAT) of the different wireless technologies.

29. The communication apparatus of claim 27, wherein the wireless technology is Wireless Local Area Network (WLAN) technology.

* * * * *

UNITED STATES PATENT AND TRADEMARK OFFICE
CERTIFICATE OF CORRECTION

| | | |
|---|---|---|
| PATENT NO. | : 9,565,626 B2 | Page 1 of 1 |
| APPLICATION NO. | : 14/157430 | |
| DATED | : February 7, 2017 | |
| INVENTOR(S) | : Faccin et al. | |

It is certified that error appears in the above-identified patent and that said Letters Patent is hereby corrected as shown below:

In the Claims

Claim 10

Column 15, Line 61, delete "assigned a specific position in the first priority ranking." and insert --assigned a specific position in the priority ranking.--

Claim 15

Column 16, Line 31, delete "A method by a mobile device for wireless communi-" and insert --A method by a mobile entity for wireless- --

Claim 24

Column 17, Line 12, delete "is assigned a specific position in the first priority ranking" and insert --is assigned a specific position in the priority ranking.--

Signed and Sealed this
Twenty-eighth Day of March, 2017

Michelle K. Lee
*Director of the United States Patent and Trademark Office*